United States Patent
Zatalovski

(10) Patent No.: US 10,437,422 B2
(45) Date of Patent: Oct. 8, 2019

(54) PERSONALIZED CUSTOMIZABLE SMART BROWSER

(71) Applicant: Yoni Noam Zatalovski, Brussels (BE)

(72) Inventor: Yoni Noam Zatalovski, Brussels (BE)

( * ) Notice: Subject to any disclaimer, the term of this patent is extended or adjusted under 35 U.S.C. 154(b) by 961 days.

(21) Appl. No.: 14/889,824

(22) PCT Filed: May 7, 2014

(86) PCT No.: PCT/IL2014/000023
§ 371 (c)(1),
(2) Date: Nov. 6, 2015

(87) PCT Pub. No.: WO2014/181318
PCT Pub. Date: Nov. 13, 2014

(65) Prior Publication Data
US 2016/0103569 A1    Apr. 14, 2016

Related U.S. Application Data

(60) Provisional application No. 61/820,470, filed on May 7, 2013.

(51) Int. Cl.
*G06F 3/048* (2013.01)
*G06F 3/0482* (2013.01)
(Continued)

(52) U.S. Cl.
CPC .......... *G06F 3/0482* (2013.01); *G06F 3/0486* (2013.01); *G06F 3/04847* (2013.01);
(Continued)

(58) Field of Classification Search
CPC ......... G06F 3/0481; G06F 9/451; G09G 5/34; H04L 41/0816
See application file for complete search history.

(56) References Cited

U.S. PATENT DOCUMENTS 6,832,355 B1    12/2004    Duperrouzel et al.
7,376,907 B2    5/2008    Santoro et al.
(Continued)

FOREIGN PATENT DOCUMENTS

JP    H06-290013 A    10/1994
JP    2008-134575 A    6/2008
(Continued)

OTHER PUBLICATIONS

PCT/IL2014/000023—International Search Report, dated Nov. 13, 2014, 7 pages.

*Primary Examiner* — Haoshian Shih
(74) *Attorney, Agent, or Firm* — Intelletek Law Group, PLLC; Gabriel Daniel, Esq.

(57) ABSTRACT

A computer device implemented browsing system with a browser application operable on the computer device and configured to simultaneously retrieve, operate and display data and functional components related to a plurality of items intended for display on a single display window of the browser application over a display of the computer device. There is a processor configured to retrieve and process the data and there are functional components related to the plurality of items The plurality of items are displayed, operated and made accessible for a user on the single display window, and the browser application is configured to allocate an area for display for every item on the display window and direct all the data and functional components related to an item: to the area on the display window. The items are selected from software programs and applications, internet and intranet websites, web links, webpages and documents.

35 Claims, 22 Drawing Sheets

(51) Int. Cl.
*G06F 3/0488* (2013.01)
*G06F 3/0484* (2013.01)
*G06F 3/0486* (2013.01)
*G06F 16/957* (2019.01)

(52) U.S. Cl.
CPC ........ *G06F 3/04886* (2013.01); *G06F 16/957* (2019.01); *G06F 2203/04803* (2013.01)

(56) References Cited

U.S. PATENT DOCUMENTS

| | | | |
|---|---|---|---|
| 7,437,678 B2 | 10/2008 | Awada et al. | |
| 7,502,867 B2 | 3/2009 | Mitchell et al. | |
| 7,705,833 B2 | 4/2010 | Kim | |
| 8,055,444 B2 | 11/2011 | Salay et al. | |
| 8,099,332 B2 | 1/2012 | Lemay et al. | |
| 8,176,431 B1 | 5/2012 | Scannell et al. | |
| 8,245,151 B2 | 8/2012 | Selig | |
| 8,751,922 B2 | 6/2014 | Epstein | |
| 8,850,010 B1* | 9/2014 | Qureshi | H04L 41/0816 709/225 |
| 8,869,027 B2 | 10/2014 | Louch et al. | |
| 9,104,294 B2 | 8/2015 | Forstall | |
| 2005/0001848 A1* | 1/2005 | Colavin | G09G 5/34 345/566 |
| 2008/0184159 A1 | 7/2008 | Selig | |
| 2008/0307070 A1 | 12/2008 | Roberts et al. | |
| 2010/0248788 A1 | 9/2010 | Yook | |
| 2010/0274775 A1 | 10/2010 | Fontes et al. | |
| 2010/0287501 A1 | 11/2010 | Seong | |
| 2011/0145717 A1 | 6/2011 | Joo | |
| 2012/0124498 A1 | 5/2012 | Santoro et al. | |
| 2012/0266101 A1* | 10/2012 | Shah | G06F 9/451 715/781 |
| 2016/0092084 A1* | 3/2016 | Dyar | G06F 3/0481 715/765 |

FOREIGN PATENT DOCUMENTS

| | | |
|---|---|---|
| JP | 2010-128593 A | 6/2010 |
| JP | 2012-185677 A | 9/2012 |

\* cited by examiner

PERSONALIZED CUSTOMIZABLE SMART BROWSER

CROSS-REFERENCE TO RELATED APPLICATIONS

This is a U.S. national stage of application No. PCT/IL2014/000023, filed on May 7, 2014, which claims the benefit of U.S. Provisional Application No. 61/820,470, filed on May 7, 2013, the contents of which are incorporated herein by reference.

TECHNICAL FIELD

The present disclosure pertains to customizable smart browser. More particularly, the present disclosure pertains to simultaneous operation and display of a plurality of software programs, applications and websites using a smart browser on a single display window.

COPYRIGHT RIGHTS

A portion of the disclosure contains material that is subject to copyright protection. The copyright owner has no objection to the reproduction by any one of the patent document or the patent disclosure, as it appears in the patent and trademark office patent file or records, but otherwise reserves all copyright right whatsoever.

BACKGROUND

Conventional web browsers involve the opening of a different browsing window or tab for introducing content, data feed or data streaming of a particular webpage. The new window may hide behind the main browsing window or opened beside it. However, continuous opening of a plurality of browsing windows, a common practice in browsing, will eventually enable the presentation of a single window due to the dimensional limitations of the display window. Otherwise, a plurality of windows will display in an overlaid, unreadable fashion. The use of tabs in a single browsing window does not solve the problem of simultaneous viewing of different websites. The non-viewed web links may operate in the background but are not viewed at the same time. Advanced web browsers, (e.g., iGoogle), provide simultaneous customizable display of websites, applications and software programs. However, selecting an item from the display causes this item to take over the entire space of the browsing window, masking all other items. From a perspective view point, the iGoogle operates essentially as a personalized gallery of a user.

While selected programs, applications and web links may still operate in the background when selecting one particular window, tab or item, they remain invisible to the user. Additionally, a user wishing to shift, for example, from one web link to another, typically selects the display window in which the other web link operates over the former display window. This overburdens the user, requiring constant shifting between different displays and disabling the monitoring capability of operations carried out in other web links, applications or programs.

It is, therefore, an object of the present application to provide a system, method and browsing software, which enable the simultaneous operation, display and monitoring of a plurality of applications, software programs and websites.

Still another object of the present application is to provide a system, method and browsing software, which enable simultaneous monitoring and operation of web links in a single display window. Accordingly, web links, applets, applications and webpages may be opened beside the original webpage on the same display window, without requiring the opening of a different window or tab or allowing a selected application or web link to take over the display window.

This and other objectives of the present invention will become apparent as the description proceeds.

SUMMARY OF THE INVENTION

In one aspect, the present application provides system, method and software of personalized customizable browser for single window condensed simultaneous display and operation of a plurality of applications, software programs and websites.

The objective of the present application is achieved by enabling web contents, data feed and data streaming from a plurality of sources to be presented in a plurality of applications, software program pages and webpages at pre-selected areas allocated for each application, software program and website in a single display window.

In one aspect, the system of the present application provides smart browser for using the internet web space that improves the navigation experience through the web by offering simultaneous access to and operation of a plurality of items such as websites, video and/or audio applications, search engines, discussion and chat rooms, blogs and so on. That is, accessing one item does not interfere with or block the access to and display of another item and does not take over the resources of the smart browser and hardware in which it is installed and prevent direct access to and display of all other items.

Thus, in one particular embodiment of the present application, the accessibility enabled by the smart browser is made possible by simultaneous display and operation of a plurality of items, where the display and operation of one item does not interfere with the display and operation of another item on display and does not take over the resources of the smart browser in order to run a particular application or access a certain web page.

The operation of a certain application, software program or website does not take over the display window. Rather, the page content, data feed or data streaming is directed to the display area allocated for the currently selected application, software or website while maintaining the ongoing display and operation of other applications, software programs and websites on the areas on the display window allocated for them. This form of concurrent operation and display enables a user to keep in tune with former selection of webpages and operation of other applications and software programs while introducing other applications, programs or websites into play within the visible region of the display window.

Further, in another advantageous embodiment, the browser of the present application enables communication and exchange of data between operating applications, software programs and websites, while simultaneously viewing the display of the communicating programs or applications. For example, a particular application may be used for sending messages to an email correspondent user. The user then observes the response in an email software program or mail service webpage running in another area of the display window.

In still another embodiment, the system, method and browser of the present application allow an operator of the browser to customize the web content, data feed and display thereof on a single display window. Such operator may be an institution, internet service provider, cloud-based service provider, website manager or the end-user.

In one particular example, an academic institution, such as a college or university, may use the smart browser of the present application to provide its students with access to its databases and information resources. A student may be provided with a login name and password allowing the student to carry out searches in academic databases which the college or university makes available to him, to view videotaped lectures delivered by the academic staff in replay or real-time, participate in study groups, correspond with fellow students, teachers and instructors, view grades and curriculum schedule and receive and send personal data. The concentration of such activities in a single display window enables the student to shift his interest among activities running on the window in a speedy and convenient way and without losing track of them. Further, the student may link between running activities displayed on window. For example, a pre-selected area of the display may be allocated to view a certain presentation or document discussed in a lecture. Further, a link to the presentation or document may be provided in another area of the display, preferably beside the area allocated for uploading the presentation or the document. Even more preferably, the neighbor area to the presentation or document display may accommodate a search engine for searching documents related to lectures videotaped and uploaded.

Further still, an area on the display beside the area allocated for displaying the lecture selected may accommodate another search engine or a list of videotaped lectures made available for display. Alternatively, a link may be provided in an area beside or under the area allocated for the display of the lecture for all documents, articles and presentations discussed in the lecture. The student may upload them by clicking on the link and they will be displayed in another area on the display window defined to accommodate the content of such links. Preferably this area is beside the area for display of the lecture. In another alternative embodiment, the search engine may be replaced with a drop-down list of such documents. In another embodiment, a pre-selected area beside the area for the display of the lecture may be allocated for links to all available uploaded videotaped lectures. This area may accommodate a drop-down list or provide means for scrolling down the list with a mouse or keyboard. Preferably, the links are provided as snapshots of the lectures and accompanied with additional data such as title, duration and number of views. The student may then follow the lecture and the presentation or document simultaneously.

In still another example, the institution may customize the smart browser according to the learning program of the student and upload personalized items of interest to the student according to his program on a single window display. The smart browser will identify the student's major academic interests according to his login name and password. Accordingly, the browser will enable the student access to its resources, directing the student to particular categorized academic topics. The browser will communicate with particular databases on the servers of the institution upon introduction of data, requests or queries the student makes. The servers will then retrieve the information of interest to the student and display it on the window. This way, the space of the display will be more efficiently used to respond to the student areas of interest and needs.

In still another example, the smart browser can be customized to fit to a fan club. Performers and artists may provide their fans with access to a website displaying selected videotaped concerts and clips, a search engine dedicated to results related to the performer/artist, the search engine front page and results list being displayed on a certain area on the display beside a space dedicated for displaying a selected result, a chat room for communicating between fans, a blog for corresponding with fans, application for posting messages and articles about or written by the performer or artist and for talkbacks of fans. All these will be displayed on a single window and allow browsers simultaneous view and convenient, speedy shift between activities made available to them on the performer website.

In still another example, an end-user may personalize a single window display made available by the smart browser functionalities and capabilities. The smart browser software enables defining a single window workspace and dedicated areas in the workspace for uploading selected websites and web links or running particular programs and applications. The end-user may then define an area for each website, web link, search engine, program and application he desires to view on the display window. The smart browser will then upload the items related to each website, link, search engine, program or application in its dedicated space. The smart browser will also automatically allocate a space for displaying a selected result beside the area defined for the main page of a search engine. The definition of a particular area on the display window will be provided as one of the variables for the smart browser in uploading a website, for example. Accordingly, the browser will fit the resolution and size of the items displayed on the website to the size of the area selected for them. Further, in one embodiment if the area cannot accommodate all the items displayed on the website, then the browser will screen out marginal items and focus on the main ones. The distinction between main and marginal items may be carried out according to different parameters such as the location of the items on the webpage and their source. Alternatively, the browser may allocate the margins of the area for display of the web site for vertical and horizontal scrolling bars. The user will then view the center portion of the webpage and can scroll to view its periphery.

It should be noted, that the functionalities of the browser discussed above are available also in all other examples and to every person or entity using it for single window running and display of a plurality of items.

In one particular embodiment, advantageously, such personalized browsing display may also provide a simultaneous view of more than one search engine page and result lists, and may provide a comparison between them.

As the smart browser is not fixed to a particular display, the end-user may also redefine the space of the display for the items selected or replace them with other items or reconfigure the entire display or part of it. The flexibility of the smart browser enables any user, including end-users, to continuously update and change the presentation of their personalized display window and operate different items simultaneously.

In a further embodiment, the margins of the display window may be used to accommodate suspended items, temporarily uploaded and operated upon selection of a web link or application. For example, a result selected for display from a result list provided by a search engine may be temporarily closed and suspended as an icon on the margins of the display window upon selection of a different result to be displayed. The previous result will resume its place on the display area upon clicking on the icon. This will cause the currently displayed result to minimize to an icon and be temporarily suspended on the margins of the display window. This way, a plurality of results may be viewed successively, preserving the option of revisiting them without further search.

The minimizing and suspension described above are applicable also to other items presented on the window. This includes applications selected from an application store, applets, software programs and documents uploaded by the user. Of course, upon a user selection, web links, applications, applets, programs and documents may be permanently closed and removed from the display. The following discussion will provide more details of the operation of the smart browser of the present application.

Data and Content Management
Content Upload and Memory Allocation

The uploading of data using the smart browser is made differentially for every item displayed on the window. The smart browser may facilitate specific data and content upload of a webpage and transmit it to the particular display area by identifying the specific data and content with the area of display. Thus, the smart browser may do so, for example, by sending a request for data and content retrieval to a server operating on the web upon a click, query or address input made by a user. Upon receiving the data and content, the smart browser will allocate a particular temporary memory space identifiable with each item and retrieve graphic content from it for display and functionality components for operating the website. The smart browser will retain the content of the webpage, application or document in the identifiable memory space or retain pointers for retrieving it again from the server. The smart browser will then upload the desired content from the memory space or send another request for data and content retrieval to the server in response to a user browsing activity within the specific area of display.

The data and content in any identifiable memory space will be automatically replaced and updated with more current data in response to the browsing activity of a user within the display area of an item. The smart browser will keep track of the movement of the user on the display window, for example, by mapping the window to a two dimensional grid and registering the cursor's coordinates. Alternatively, the smart browser will attach an invisible detection point to the cursor, which follows the cursor's movement on the window. A two dimensional grid or tracking point may be applied to different technologies of moving around a display window, in particular touch sensitive screens. Thus, the smart browser may identify the location of a user's finger or pen on the window, translate it to two dimension coordinates and relate it to a particular area of display of an item. This way, the smart browser prioritizes the treatment, processing and activation of the displayed items.

For example, when the smart browser identifies the location of the cursor or a user's finger or pen (for touch-sensitive screen technologies) outside the boundaries of the display area of a certain item, the streaming of graphic and content update of that item will stop and remain in idle state unless the user initiated a certain ongoing activity in that item. Alternatively, a more efficient use of memory space will retain only graphic content on the identifiable memory space and pointers to the content for upload upon resuming browsing activity in the display area.

The smart browser actually applies the differentiation in all levels of processing data retrieval and display. This enables it to control and operate a plurality of items independently of each other, allowing it to keep certain functionalities of such items still running, e.g. display of graphics, streaming video clip content or running a query in a search engine, while focusing on the activity of other items according to a user preferences.

Page Refreshing

As explained and exemplified above, the differentiation of display entails also differentiation of content management and memory allocation. Furthermore, the smart browser will restrict particular activities either embedded in an item displayed on the window or associated with it and the display area it occupies. Page refreshing, applied especially in news or any continuously updated website is such activity. The memory and resources differentiation that the smart browser applies to the multiple items display window will also restrict the refreshing activity to the particular area of the refreshed item. Namely, the smart browser will define the area allocated for the item as a separate browsing window for the purpose of applying such activity. To this end, the smart browser will translate the boundaries of the allocated area to coordinates on a two dimensional grid and use them as input for the activities unique for the particular item displayed on the specific area.

In fact, all activities, operations and actions in the items may be defined as unique, if only for the reason that they take place in items on display independently of other items also on display on the same display window. Therefore, any activity as data input, query on a search engine, streaming of videotaped performance, online corresponding with other users or data feeding of real-time news may be considered unique activity. The differential treatment and data processing applied by the smart browser enable their operation to be concurrent and independent of each other.

Interactive Communication Between Applications

In order to improve the simultaneous visibility of a plurality of items and enable users to further exploit their concurrent operation, the smart browser enables communicating between applications. This may take place, for example, in any one of the following ways:

Correspondence—Email, Chat, Messaging

A user may wish to upload a particular application for sending messages, where the application enables the user to input an address acceptable by any type of correspondence receiving and transmitting application, e.g. e-mail service or software, online chatting service, short messaging service (SMS) and the like. After sending, the user may then see their message and/or the response to their message on a different item displayed by another correspondence service item on another area of the same display window.

Action-Reaction Visual on Separate Spaces of a Single Display

The interaction between simultaneously single window displayed items may be further enhanced to input data in one item and receive a result in another item. The smart browser provides the functionality of taking the input data and the destination item and transporting them to the memory space allocated for that item. The input data are received and processed by the destination item and the result displayed on the area allocated for it on the display window. Operations such as mathematical calculation, search queries or even general questions may be used as input and transported for processing between items. The destination item may be provided for example as the URL address or go by its commercially familiar name. After processing, the smart browser will join the result with area display coordinates in and of the destination item and transmit them to the proper place on the display window. The user may then simultaneously view the input and output of his operation on the same display window.

Options List Update According to Item Selection

Another example is the return impact of operation in one item on another item. When an item is selected from a list, whether drop-down list or a list generated by a search engine, the list itself is updated according to that particular selection. While such interaction between items is well known in the art, the separation between them on different display areas makes it more convenient, as the user may concentrate on the item selected and displayed in one area of the window and scroll down the list when he so desires on another area. The smart browser will also allocate separate memory spaces to the list and displayed item and manage their data retrieval and data streaming separately. This renders another benefit of faster uploading and retrieving data in two separate channels. Further, any activity in the results list does not affect the item selected for display. The two sub-items, i.e. the displayed item and the updated list, are no longer required to be uploaded together. Therefore, memory and time consumption are reduced.

Division of Display Window

Single Window Simultaneous Display

In one particular embodiment of the present application, the simultaneous access to and operation of a plurality of items is enabled by dividing the display to a plurality of sections, each section being dedicated to a particular item, website, webpage or application. Such simultaneous display may be provided to a user of the smart browser or the smart browser may enable a user to customize the display according to his preferences.

In still another embodiment, the smart browser may allocate an area of the display window for permanent display and another area for alternating display. Thus, the smart browser enables defining the top section of the display window as permanent display, and elect items, applications, websites and programs to be displayed permanently on that section. The smart browser may then enable defining the lower section of the display window below the permanent display as alternating display section. The smart browser may then be configured to direct the uploading of applications, websites, web links, documents and software programs selected from the items on the permanent display to the area of the alternating display or a part thereof. In this configuration, the permanent display may be efficiently used to accommodate items such as search engines, messaging and correspondence services and favorite websites and links. Further, the alternating display section is configured to display items from the permanent display section. For example, a link to a website, item such as a video clip, webpage or document from a search result list may be opened in the alternating section upon clicking on it. Further still, clicking on another link in the list on the permanent display area will close the previous link on display and replace it with the display of the newly elected link.

In another particular embodiment, the smart browser of the present application provides a user with tools for controlling the operation and display of the items selected. In particular, the smart browser provides a user with capabilities to enable or disable the operation of one or more items, to add one or more items to the display or remove them from it, and temporarily remove one or more items from a display, for example by miniaturizing and relocating them to a bar or margins at the sides of the display.

In still another particular embodiment, the smart browser of the present application provides a pre-selected size of display for each item. Accordingly, the items selected by a user will automatically occupy a certain space on the display according to pre-programmed preferences embedded in the smart browser. Further, the smart browser may also automatically elect the location for each item on the display. For example, the smart browser may automatically allocate the top section of the display to a search engine webpage, the bottom left section to a video display and the bottom right section to a chat room. Further and in accordance with the automatic functionality of allocating space for display for the items selected, the smart browser will continue to further divide the display space as a user adds more and more items, while applying capabilities that balance between the legibility of the presentation of the items and the display of as many details as possible. For example, the smart browser may retain a search result list produced by a search engine and hide ads, marginal text and other supplemental details that accompany them as the space allocated for the search engine webpage is reduced.

Alternatively, the smart browser provides a user with customizing functionalities for adjusting the display of the items according to his preferences. Accordingly, the smart browser may allow a user to set the dimensions and location of items on the display for his convenience. The smart browser thus allows a user to first elect items, e.g. websites, search engines, video movies and applications, and then define the dimensions and location of their presentation on the display. In a further particular embodiment, the smart browser enables a user onsite allocation of space and location of items. For example, the smart browser may define invisible boundaries of display for each presentation of item, which are temporarily revealed when a cursor is placed over them. Then the smart browser will enable a user to increase or decrease the space that these boundaries define by dragging one side or corner of the boundaries away or toward the side opposite to it. Accordingly, the smart browser will automatically allocate the space of the display that is left vacant to neighbor presentations of other items.

In an alternative or additional option, the smart browser automatically defines a center point of intersection among neighbor presentation of items. A user may then redefine the allocation of display space of an aggregate of items by locating the cursor over the center of point intersection and dragging it freely within the broadest boundaries defined for the aggregate of items. Accordingly, the display of certain items will enlarge on the expense of the reduction in display of their neighbor items. For example, the smart browser may automatically define such center point of intersection for the presentation of every four neighbor items and to the entire space of display. Thus, the display may comprise a plurality of local center points of intersection within an aggregate of items, between neighbor aggregates and one main center point of the entire display window. Of course, enlarging the display space of one aggregate of items will reduce the display space of its neighbor aggregates.

In still another particular embodiment, the onsite dynamic reallocation of display space may by be implemented to touch-sensitive screens. This proves to be beneficial in using a version of the smart browser of the present application adapted to smartphones, tablets and other electronic devices equipped with touch-sensitive display means. The formation and wiring of such display means may be within the conventional technology of touch-sensitive screens, which enables dragging and moving display of items from one location to another. The boundaries of display space and center points of intersection may be particularly defined and designed to respond to movement of a finger of a user over them by displaying themselves upon such movement and redefining the space allocated for the presentation of an item or aggregate of items upon application of pressure and traveling on the display screen.

In still another particular embodiment, the smart browser may rearrange the display of an item on display in order to fit it to the particular area allocated for the particular item. Accordingly, the smart browser identifies the automatically allocated relative locations of components displayed on a website or program window, application or document and reconfigures the display by reallocating them to other places within the display area of the particular item. The smart browser may apply this reallocation by calculating the space available in the area of display while considering the resolution available for the particular window and the number of components in the item. The smart browser will then define the limits of each component and reshape it according to the particular sub-space allocated for it in the display area of the particular item. Furthermore, the smart browser may also screen out marginal or associated components from the display, particularly components which are not directly related to the main content and functionality of the particular item. Such components may be retained in temporary cache memory and displayed upon allocating the item a larger area of display.

Alternatively, the smart browser receives a reconfigured display of an item, e.g. website, application, software program window or document, where the display is already adapted to the particular area allocated for that item. This is applicable in particular to the permanent display section in the display window described above.

In still another embodiment, the smart browser redirects the display of an item, website, program, application or document in the multi-display window to a separate window or tab dedicated for maximal display according to user preferences. Optionally, the selected item will reduce to an icon presentation on a side bar of the original display and resume its place in the multi-display window after closing the second dedicated window. Otherwise, it may be retained temporarily as closed icon on the side bar of the multi-display window.

Size and Scale Adjustment of Display Space

As mentioned in previous sections of the present application, the display space may not be sufficient to accommodate all of the applications, web sites and links, software programs, applets and documents selected. Therefore, the smart browser will use the display resources including the window space and level of resolution available for the particular device on which it operates as input variables for adjusting each display area to the current concentration of items on the window.

Data Selection and Data Compression

The manifestation of condensing the display of items may be brought about by selecting the most relevant or pertinent portions and items of an item for display in a particular area and at least temporarily discarding of marginal items. Relevant and marginal portions of website, for example, may be a video clip selected and a list of links for other video clips and viewers comments, respectively. Accordingly, only the currently elected video clip will run on the display area defined for the particular website, while all other portions of the website will be stored for example in a cache memory until a larger area is allocated for display.

Other particular marginal components may be banners, commercials, adds and the like, accompanying the main content of the website. These will continue to be uploaded or streamed to the area allocated for the particular website, for example, but will be cut from actual display and stored until additional display space is allocated or made available. It should be noted that the hidden content of an item, e.g. website, application, document etc., is continuously updated upon browsing. Therefore, only the most recently updated hidden content will be displayed upon allocation of available area on the window.

Alternatively, the smart browser may run a compression routine in order to display as many portions of the website, application or document as possible. Thus, the smart browser will not necessarily discard particular items, but will miniaturize them or reduce their resolution in order to accommodate as much of the content initially displayed on a fully deployed website, application or document. The smart browser will consider the level of resolution available by the particular hardware it runs on and determine accordingly the resolution of viewed portions of items in condensed format.

In a third alternative embodiment, the smart browser may allocate part of the margins of an allocated display area for scrolling bars. Thus, the smart browser will generate mini-display windows within the larger window, in which all items may be viewed upon scrolling through the webpage, document or application page currently displaying. The content not visible will be regenerated upon scrolling up and down or left and right the mini-window.

App Store-Application Upload and Suspension

In another embodiment of the present application, the smart browser may keep a hidden application store or application library for uploading applications made available to a user. The application store may be displayed separately upon clicking on a link on the main display of the smart browser. A user may then select an application with a click on the mouse or using his finger or a pen if touch screen is used. The application will then open and the display will be automatically shifted to the main display causing the display of the application store to hide.

In one embodiment, the smart browser allows an application icon or window to be displayed over the main display window. The icon may be dragged and overlaid anywhere on the display window. It may then be opened, operated, temporarily closed and suspended in a side bar of the display window or closed and returned to the application store.

In an alternative embodiment, the smart browser may be configured to automatically allocate an area on the main display window for opening the display of the application selected. Such area may be pre-selected and dedicated for upload and display of applications. Alternatively, the user may manually drag and pin the application icon or window in any area of the display. The smart browser will identify the coordinates of the application icon or window and automatically incorporate it with the aggregate of applications, websites, links, programs and documents in that area. Accordingly, the smart browser will reconfigure the area occupied by the aggregate and allocate a space to the application icon or window, proportionally reducing the area allocated for each item in the aggregate. Correspondingly, the smart browser will reconfigure the memory space allocated for each item in the aggregate, returning to cache or temporary memory components and functions not visually available at the display of an item and transmitting main graphic components and functional elements to the display.

Alternatively, the smart browser may be configured to open the application on the alternating area of the main display window. When launching an application the smart browser will automatically replace the current website, link, program or document with the selected application. It will temporarily close the current item on the alternating display and suspend it as an icon on a side bar of the mam display window. The application display will take its place on the alternating display area. The smart browser will reduce the application to an icon and place it on a side bar of the main window upon temporary closing of the application. The smart browser will then resume the display of the previous item on the alternating display area or leave that area blank for display of another application, website, link, program or document.

The user may then perform the operation desired with the application and retain it open over any space covering the main display window. Alternatively, the user may suspend the application by minimizing the application window to an icon and placing it on the margins of the main window. Alternatively, the icon will automatically send itself to a margin of the main window upon minimizing the application window.

Implementation

The implementation of the smart browser may be carried out in and adapted to different hardware technologies. The smart browser comprises all the functionalities and capabilities to manipulate the hardware tools for applying the single window display of a plurality of items. In one embodiment, the smart browser may be provided as stand-alone software, which may be installed on a computer by an end-user. The user may then personalize the display according to his preferences and enable the functionalities of the smart browser in order to exploit the resources of the hardware in which it is installed. This includes also private databases and software and application menus accessible only to the user.

In still another embodiment, the smart browser may be installed on a web server, whether internet or intranet, and provide customized display windows for all terminals connected to it. Such installation provides central control over the smart browser capabilities and alleviates the terminals from applying them. The terminals will then receive display windows customized according to a pre-determined policy, preferably sectioned to groups of people with similar needs for access to databases, computation resources and the like. In still another embodiment the smart browser may be installed on a dedicated server farm and made accessible for subscribers. This configuration is similar to the previous intranet one, however with using the World Wide Web as the communication and data transfer network. A user may register as a subscriber and be provided with login name and password. He may then access his account and personalized display window from any computer connected to the network. He may also update, reconfigure and change his personal display window permanently or temporarily. The user may be asked whether to retain the updates to the display or not before logging off. A positive answer will establish the updated display as the currently available one for that user. A negative answer will close and clear off all the applications and results uploaded during a browsing session and return to the former display.

It should be noted that the visual display of the smart browser window is not limited to screens of computers, portable and non-portable, and smartphones, regular or touch-sensitive. Further, the smart browser of the present application may be uploaded to a microprocessor and displayed on screens integrated into a variety of devices, furniture and appliances comprising appropriate microprocessor and display screen. Particularly, the smart browser of the present application may be used in devices, furniture and appliances comprising appropriate microprocessor and display screen, selected from glass mirrors, glass windows, particularly glass windows of vehicles, e.g. private cars, trains, subway trains, and front shields of motorcycles, microwave, refrigerator and oven doors, touch clothing, tables, kitchen, room and office cabinets, doors and windows and virtual screens.

In still another embodiment, the smart browser can be made accessible on a cloud-based server. The user may run their own personal database and software and application menus on the cloud server and use the smart browser to personalize the display to accommodate any one of the items on their databases, software and applications. In this particular application the smart browser provides the full benefits of a personal computer on which the browser is installed and access to personal databases.

The following describes non-limiting examples of the present application with relation to the accompanying drawings. Other objects and features of the present application will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The properties, features and advantages of this invention that are described above and also the manner in which they are achieved will become even more comprehensible in connection with the description of the drawings that follows, in which.

DETAILED DESCRIPTION OF THE DRAWINGS

Preferred Embodiments

Figure 1:
FIG. 1 depicts a particular configuration of display of the smart browser.
Figure 3:
FIG. 3 depicts another particular configuration of display of the smart browser with particular software.

FIG. 1 depicts a particular configuration of a short display version provided by the smart browser. In this configuration, only a multi-component permanent area appears on display at the top portion of the display window. This top display area accommodates a selected search engine, a video clip display website including result list, viewers' comments, a selected video clip on play, correspondence, and a messaging service website. A lateral bar is displayed above the top permanent display area. The lateral bar accommodates minimized icons of websites, web pages and applications previously uploaded and are currently in suspended state. The lower alternating display area is occupied by a text editing program of a document uploaded by the user. The display area also contains a visually available contact or friends list at the side of the display window. A user may access any of the links available in any one of the items at the top permanent display area and functionalities they make available to the user. At the same time, the user may continue to carry out editing work of a document at the lower alternating area of the display window. This configuration exemplifies the visually simultaneous access a user is provided with to a plurality of both network operating items and work or study related activities he might be engaged with. If so desired, the user may reconfigure the display window to temporarily enlarge the software program window at the lower alternating area of the display at the expense of the top area. Such option is depicted in FIG. 3. The top permanent area may be exposed upon clicking on a return or home button. The smart browser return button may display with reduced opacity in order to distinguish it from other neighbor buttons. Thus, the user may easily locate it and return the top permanent display. Alternatively the user may redirect the display of the software program application to a separate window in case he wishes to concentrate on that particular application or spread on a larger area of display. The smart browser will then keep contact with the multi-component display window using a return or home button, for example in one of the toolbars at the top portion of the display window. Upon returning to the smart browser display window, the smart browser will redirect the content introduced into and functionalities activated at the software program back to the lower area of alternating display. The smart browser will resume the view of the permanent display and enable the user to continue with the editing work at the lower alternating area while keeping sight of the updates and links at the permanent display. This arrangement may prove to be efficient at the editing work itself, in case a user may wish to import information, links, pictures or any other items discovered by a search engine and displayed at the top permanent display area to the application running at the lower alternating display area. This is, of course, without shifting between different windows or tabs or tiling windows within the limits of the display window.

Figure 2:
FIG. 2 depicts another particular configuration of display of the smart browser showing the app store display.

FIG. 2 depicts a display of the smart browser, showing a two part division of the display window as in FIG. 1, but when the app store (application store) is made accessible and viewable on the smart browser display window. The top permanent display area is kept as well as the contact or friends list at the left side of the display, while upon calling on the app store, the smart browser automatically displays it at the lower alternating display area. The user may then upload an application, either free or purchased by clicking on the icon representing it. The smart browser will open the application in the lower alternating display area instead of the app store display or in a window overlaid on the app store display. Accordingly, the smart browser will allocate memory space and resources available on the hardware and software to run the application. The application opened may be returned to the app store when closing it or suspended as an icon on a side bar of the smart browser display. The user may open more than one application (e.g., as far as the hardware and software resources allow the user to) and view their operation and simultaneously output on a single display window of the smart browser. When opening a number of applications, the smart browser may configure the lower alternating display onsite to accommodate all of them at automatically selected sub-areas. Otherwise, the applications windows are tiled over the app store display and may be dragged and placed anywhere on the display screen.

Figure 4:
FIG. 4 depicts another particular configuration of display of the smart browser with particular application.
Figure 5:
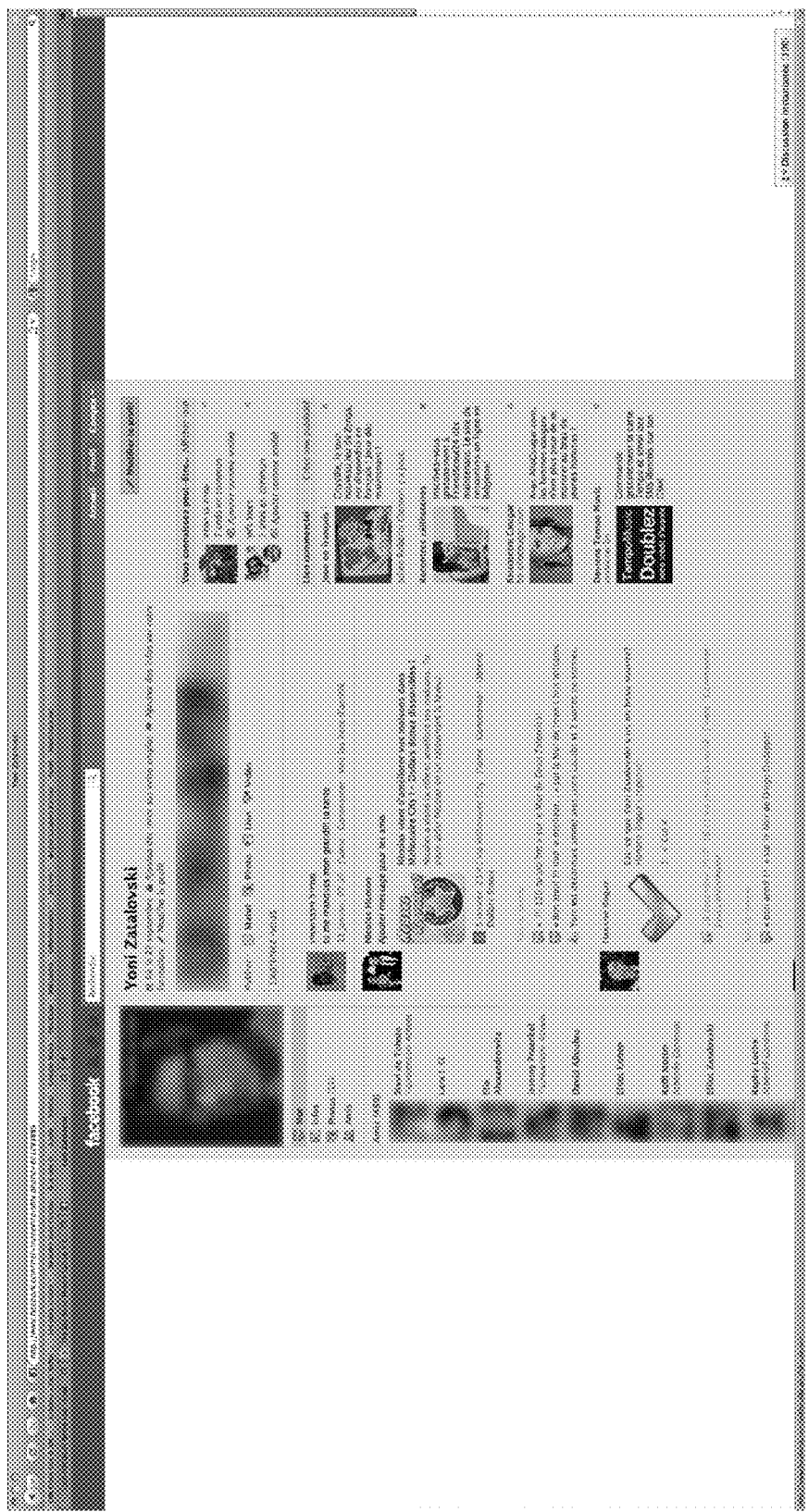
FIG. 5 depicts another particular configuration of display of the smart browser with particular application.
Figure 6:
FIG. 6 depicts another particular configuration of display of the smart browser with particular allocation of display areas.

FIGS. 4-6 depict the actual (FIGS. 4 and 5) and modified (FIG. 6) display of websites using the smart browser. These examples demonstrate the capability of the smart browser to reconfigure the display of items in order to adapt them to the display area, which is allocated for them in the display window. Reconfiguring the display of websites improves display area usage, which enables condensing a greater number of items in a single display window.

Figure 7:
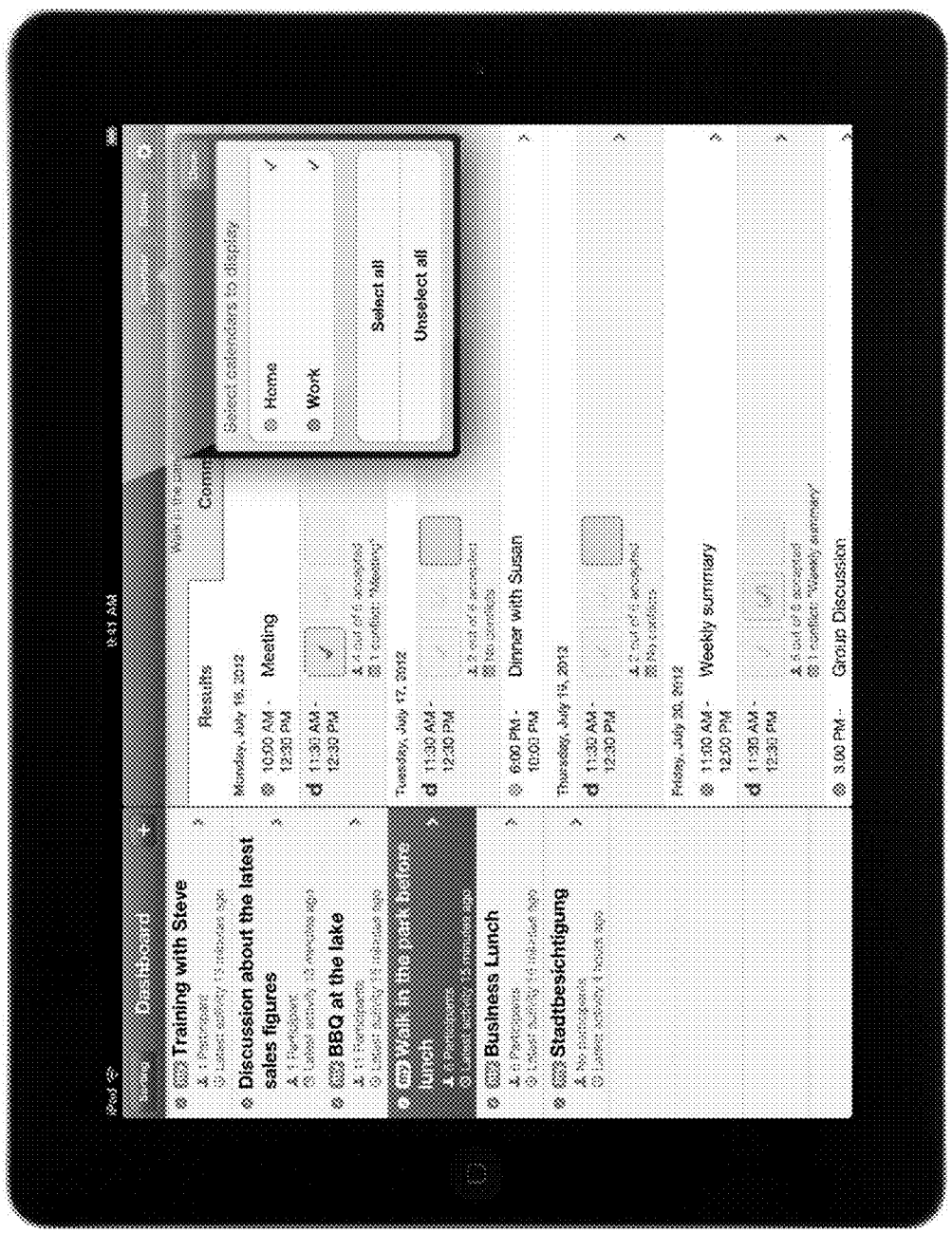
FIG. 7 depicts another particular configuration of display of the smart browser with particular allocation of display areas adapted for a tablet.
Figure 8:
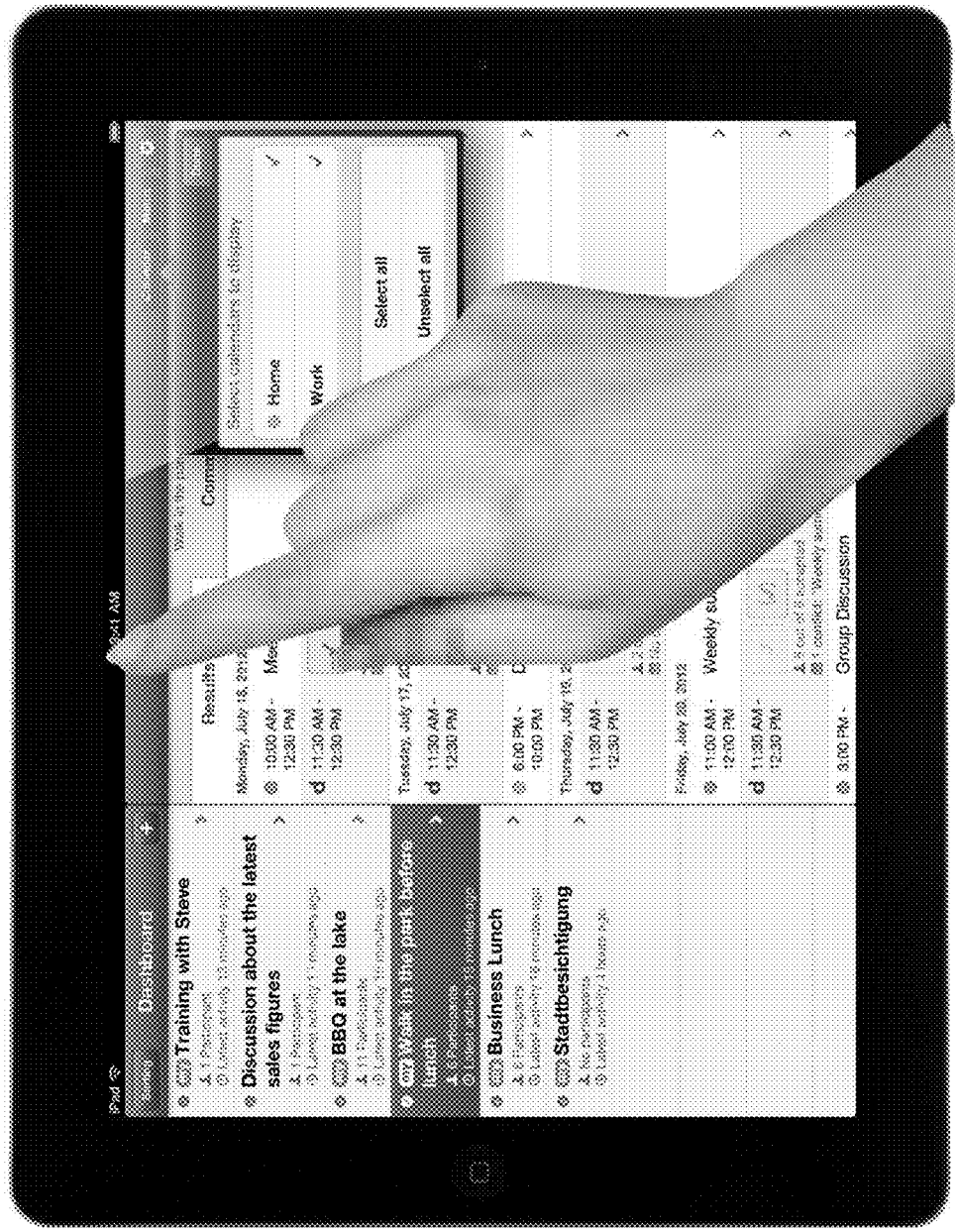
FIGS. 8-12 depict a particular configuration of display of the smart browser with particular allocation of display areas adapted for a tablet in different modes.
Figure 9:
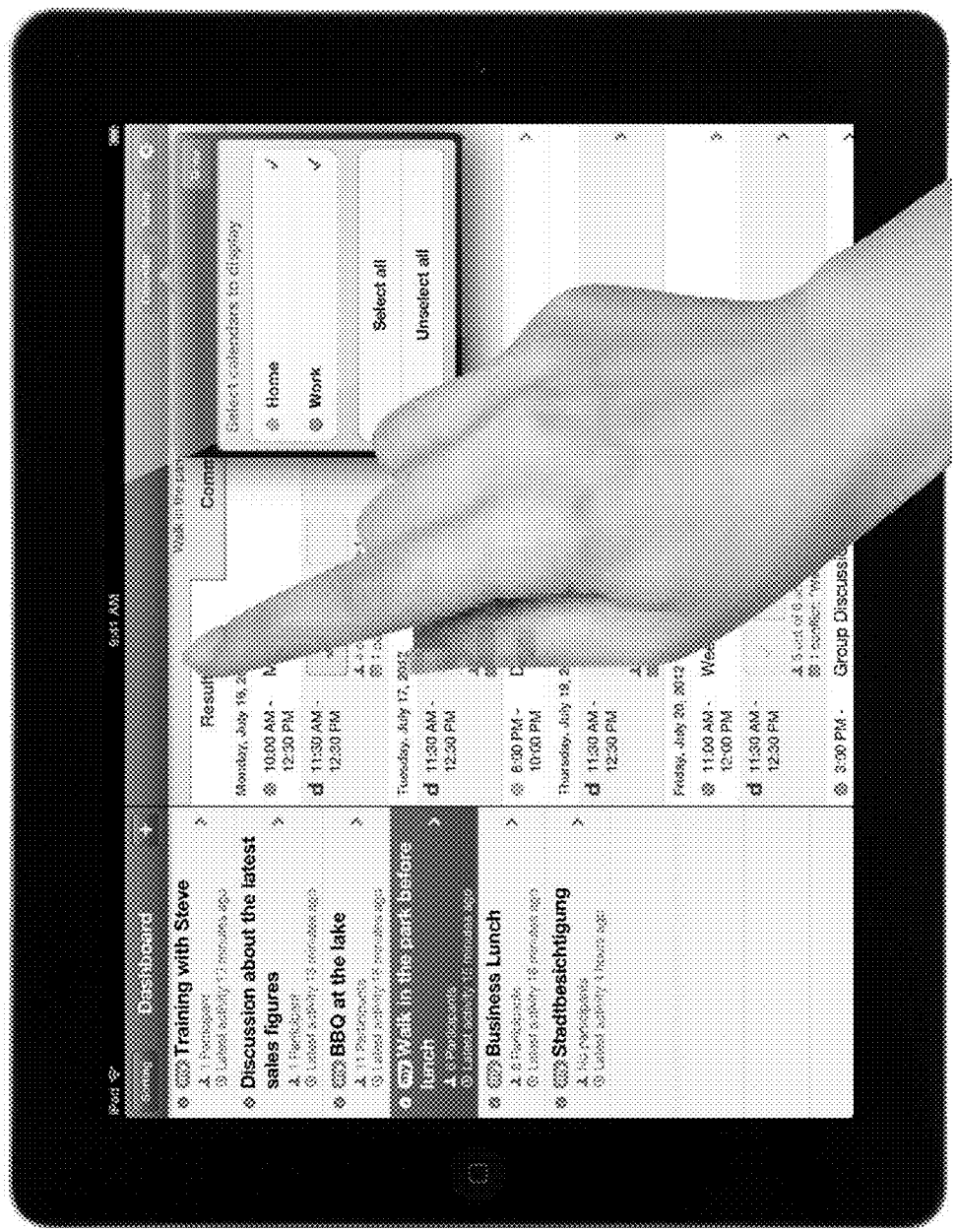
Figure 10:
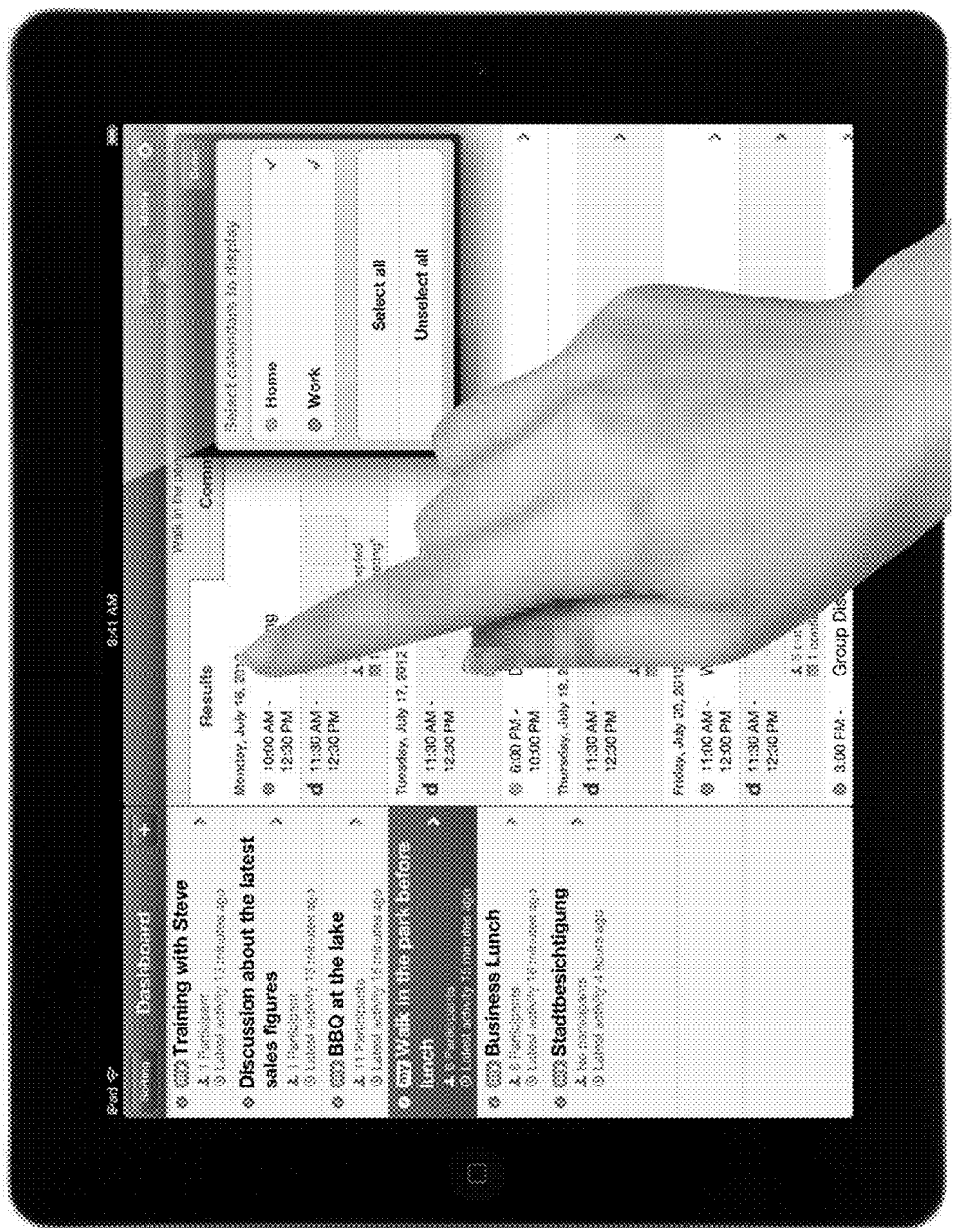
Figure 11:
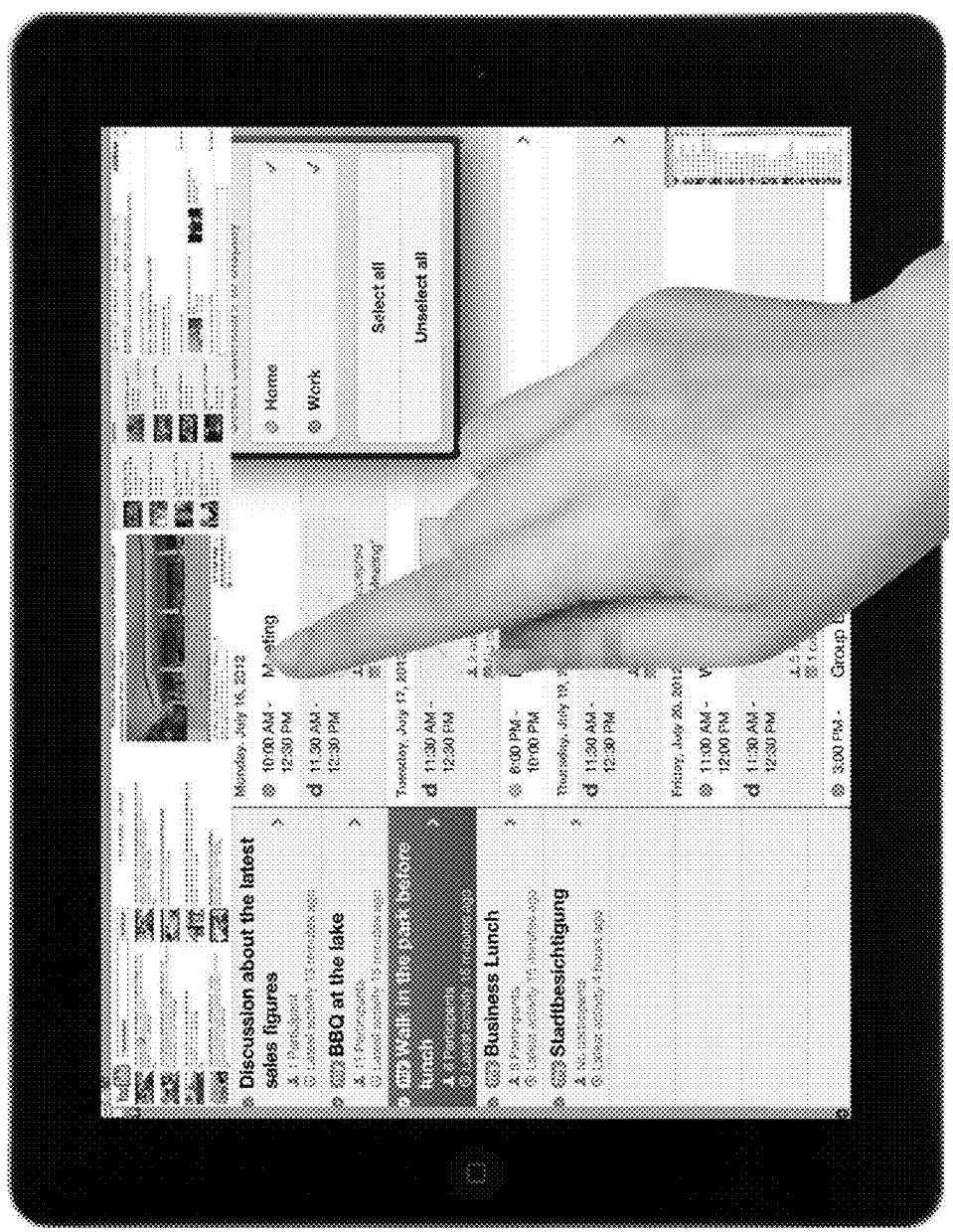
Figure 12:
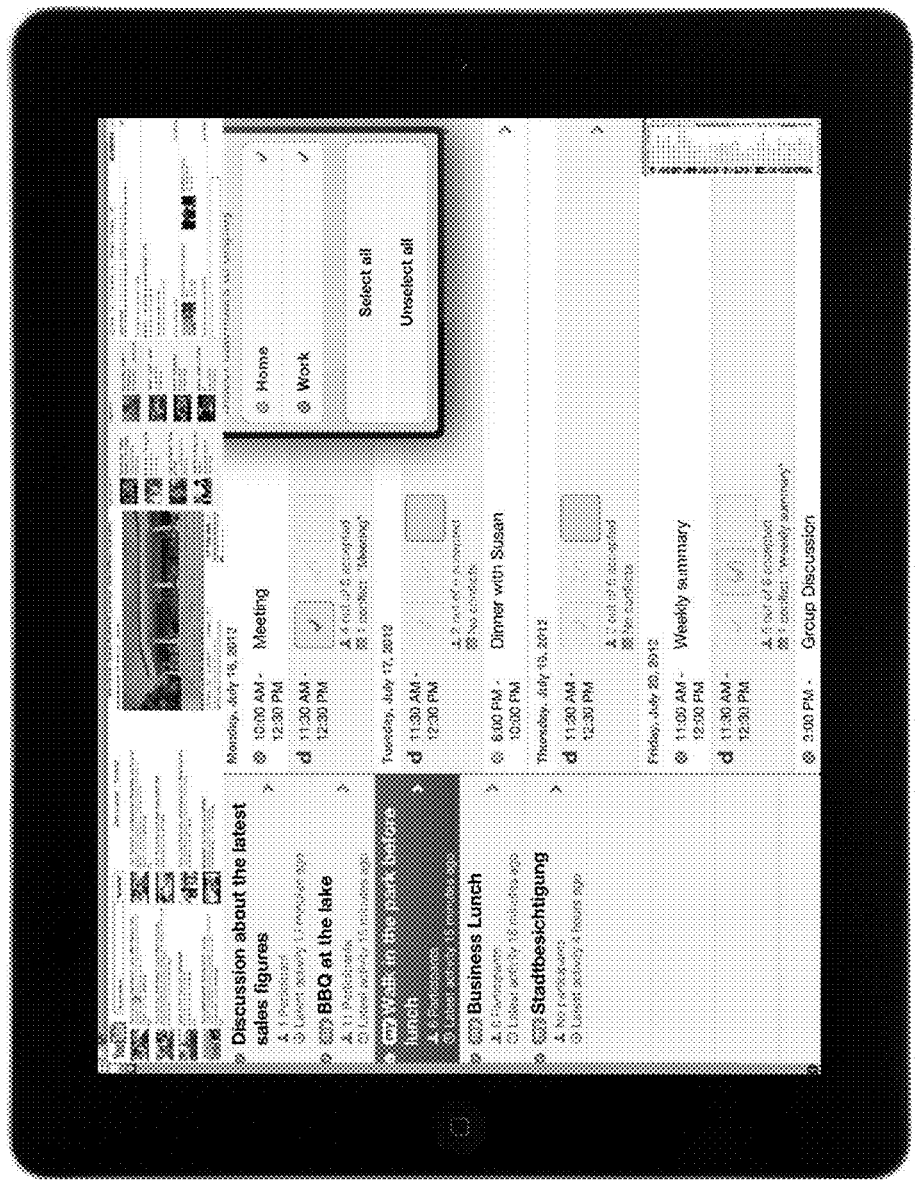
Figure 13:
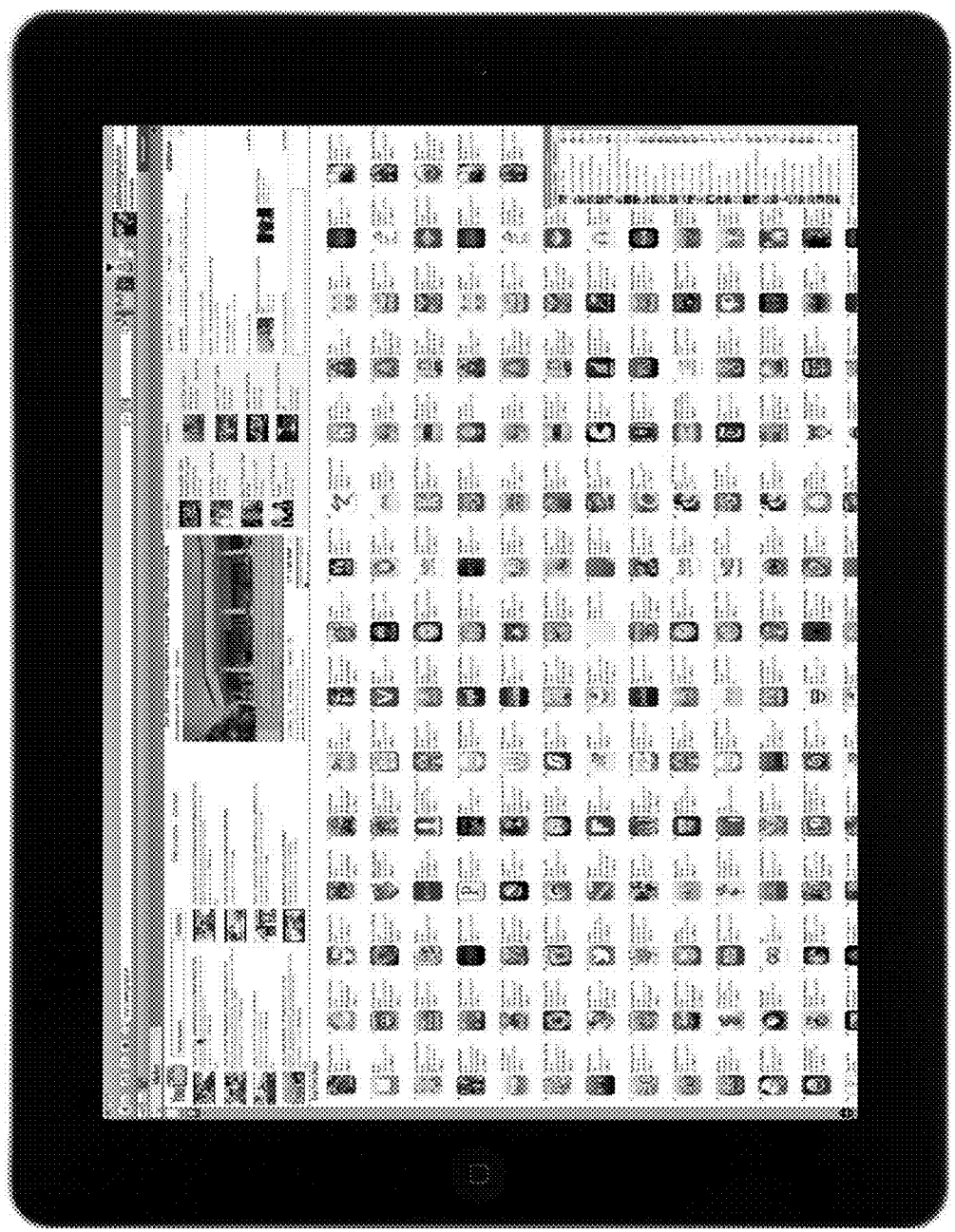
FIG. 13 depicts a particular configuration of display of the smart browser with particular allocation of display areas and app store adapted for a tablet in different modes.

FIGS. 7-12 depict a particular configuration of display of the smart browser to a touchpad, which contains a touch-sensitive screen. In this particular example, a "box email reception" program is operated and displayed on the lower alternating area, whereas the top permanent display area is kept temporarily invisible. The top lateral bar comprises or is itself a toggle button enabling the showing and hiding of the permanent display area at any given moment, while another program such as the box e-mail reception is operating and displayed at the lower alternating area (FIG. 7). FIGS. 8-11 follow FIG. 7 showing how to expose the top permanent display area while still operating the program in the lower alternating display area. The smart browser enables concealing the top permanent display as shown in FIGS. 8-11. In such case the lower alternating display area takes over the entire display window except for the top lateral bar. The smart browser exposes the top permanent display area upon clicking on the top lateral bar. Once the top permanent display area is exposed as shown in FIG. 11, the user may continue to operate and work on the program at the lower alternating display area. The user may then continue with both browsing on the net through the links available at the top permanent display area and continue to perform the functions of schedule updating at the "box email reception" program displayed in the lower alternating area. FIG. 12 shows all of the elements of the smart browser in exposed configuration as illustrated schematically in FIG. 16. In FIG. 13 the smart browser is shown as displayed on a touchpad device with a touch-sensitive screen. The top permanent area shows all of the links, websites and programs elected by the user and configured each in a particular presentation, which is not necessary the original one. The smart browser rearranges the components of any webpage in order to fit to the area allocated for it, while maintaining the display of other webpages. The lower alternating area displays the uploaded app store, when a user clicks on the link to the app store (see FIG. 16). The user may then select and open an upload, which may be displayed within the lower alternating display area or overlaid on it. The application may then be closed and returned to the app store or miniaturized suspended and as an icon placed at the margins of the display window.

Figure 14:
FIGS. 14-16 schematically illustrate division of the display window according to a particular configuration of the present application.
Figure 15:
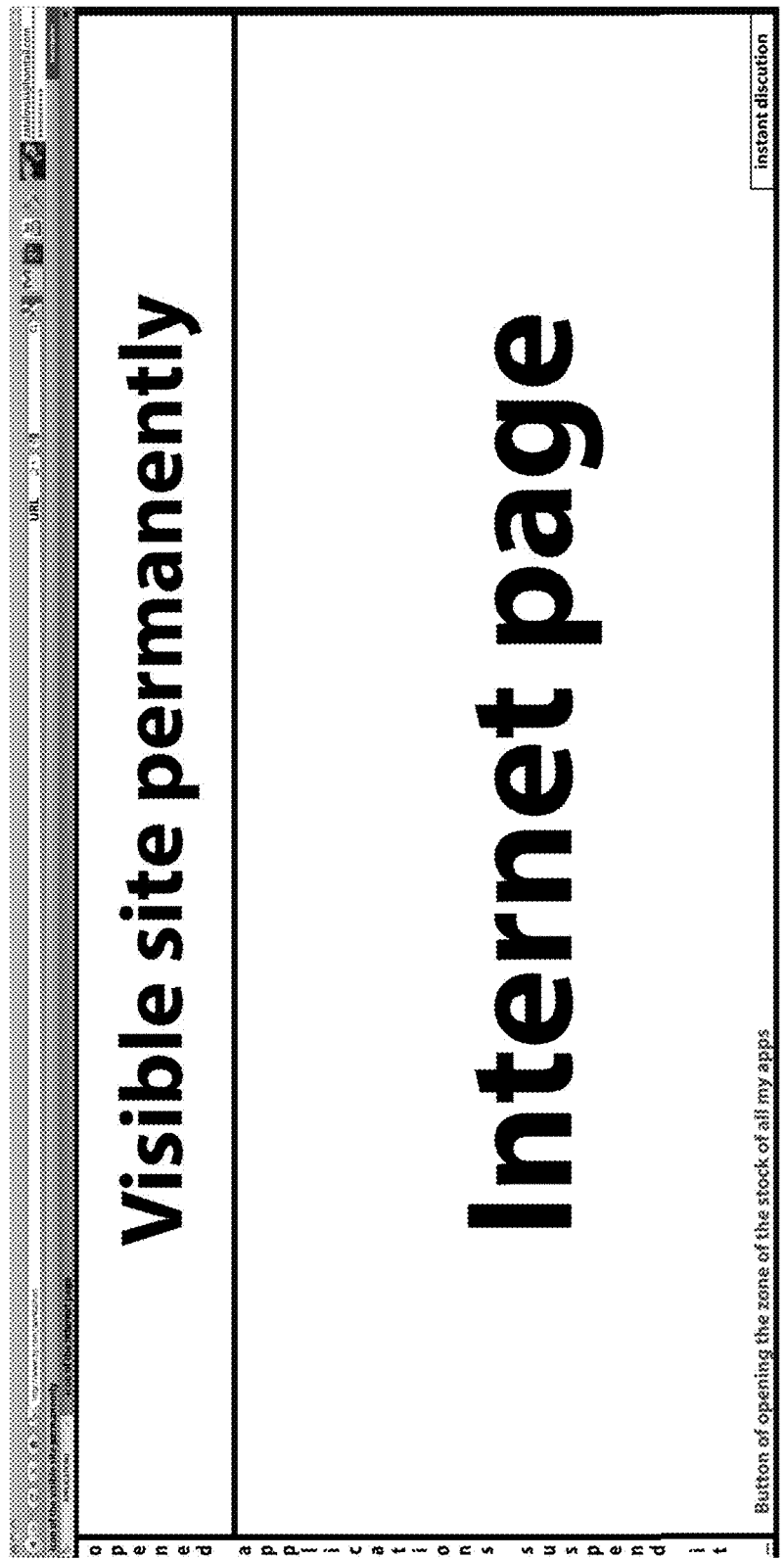
Figure 16:
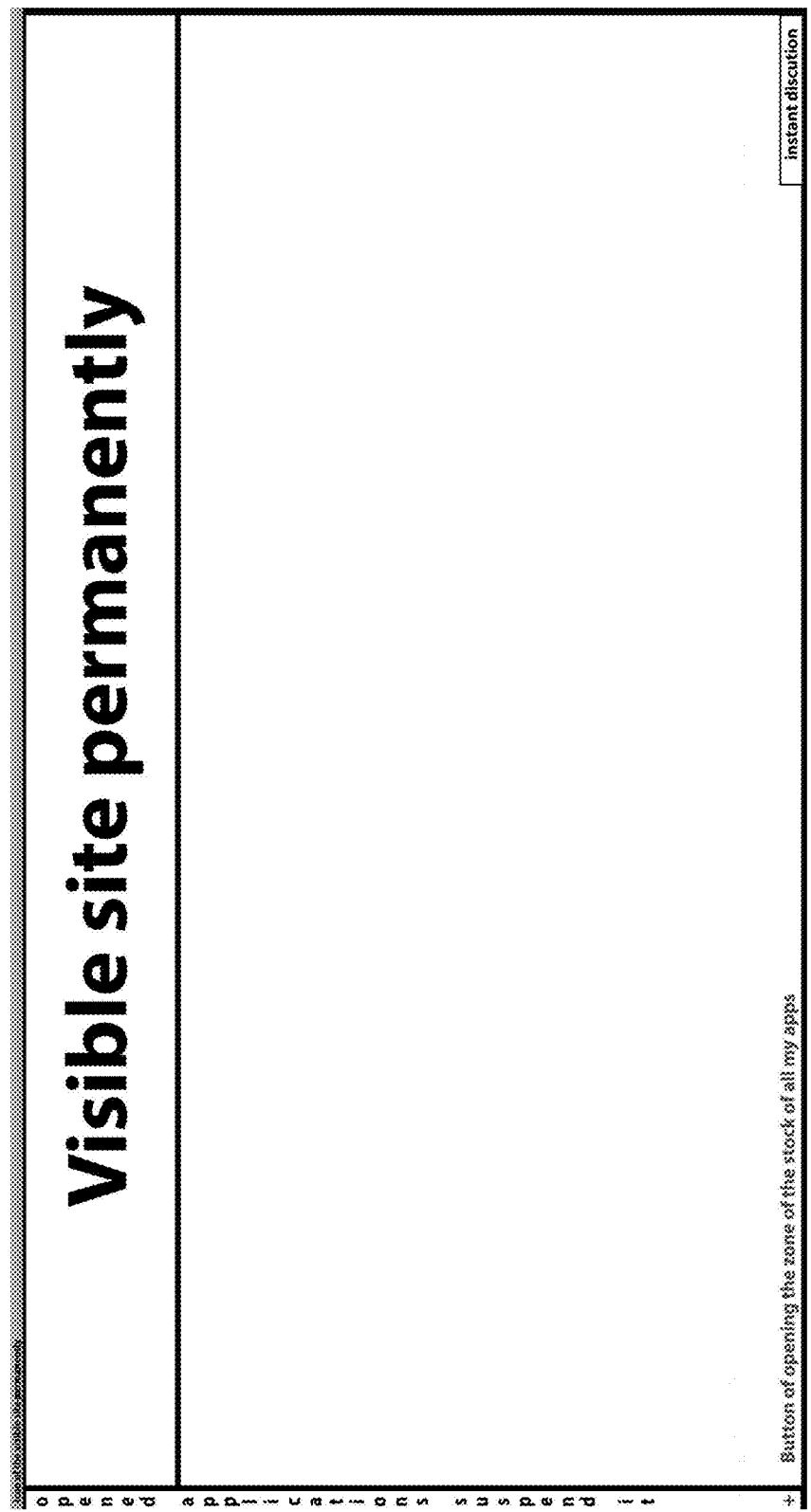

FIGS. 14-16 schematically illustrate the division of the display to the main areas according to a particular application of the application. The top portion is dedicated to permanent display of selected items, e.g. websites, links, search engines, software programs and corresponding and messaging services applications. The lower portion of the display window is used for alternating temporary display of particular links selected from the permanent display area or applications from the app store. The left side margin of the display window is used for placing icons of suspended applications uploaded from the app store. A button at the bottom of the alternating display area is used to open the app store. Additionally, a button or link at the right bottom corner of the lower alternating display area is used to upload and re-upload a corresponding and messaging application operating at the background and which may be accessed instantly. The smart browser also provides the components of an ordinary browsing display such as the URL address box, a button for scrolling through previously opened webpages and the like. The uppermost margin of the display window may also be used to display icons of opened websites and links which are currently not used or required.

Figure 17:
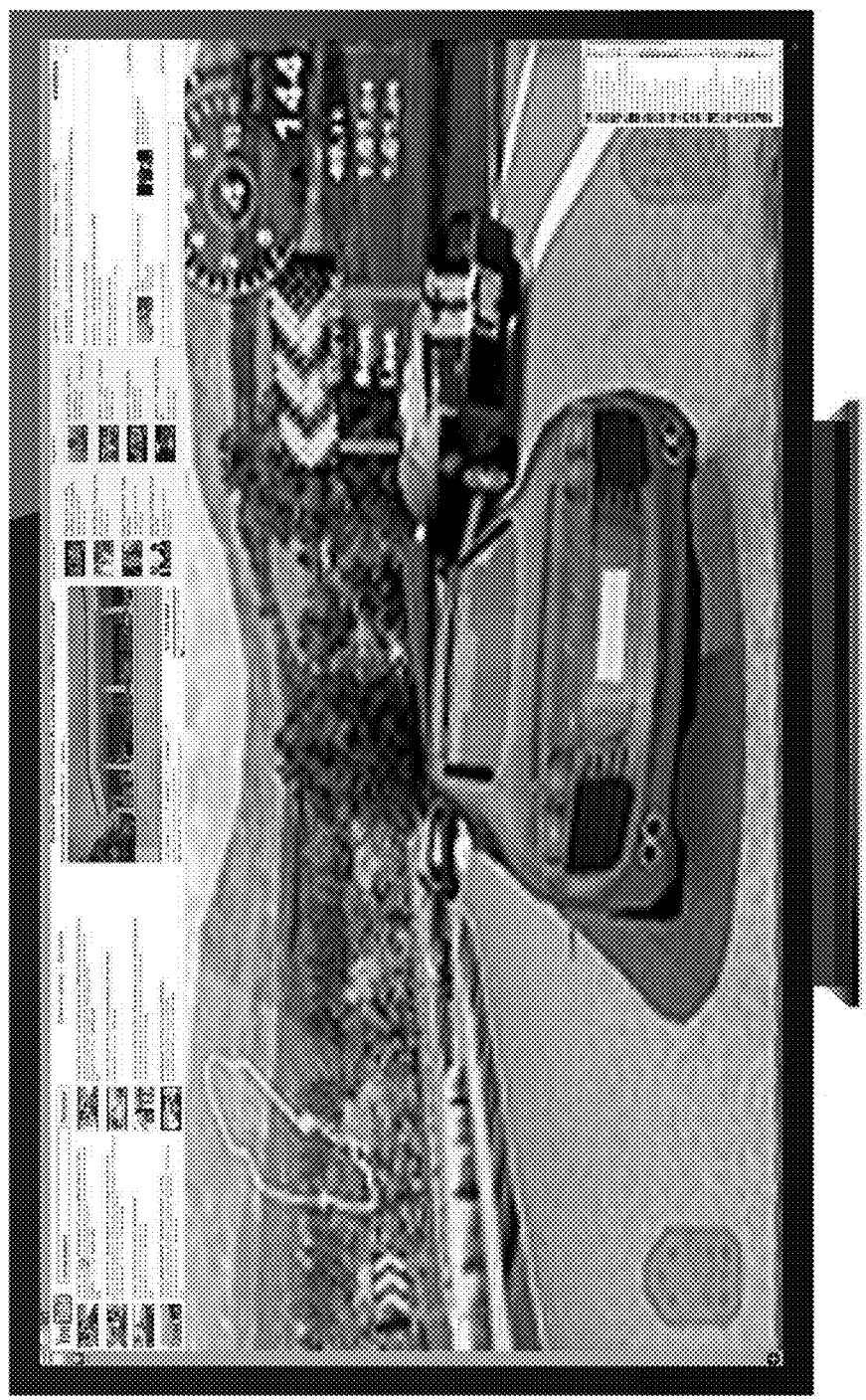
FIGS. 17-18 depict division of the display window according to a particular configuration of the present application and display of selected items.
Figure 18:
Figure 19:
FIGS. 19-22 depict another division of the display window according to a particular configuration of the present application and display of selected items.
Figure 20:
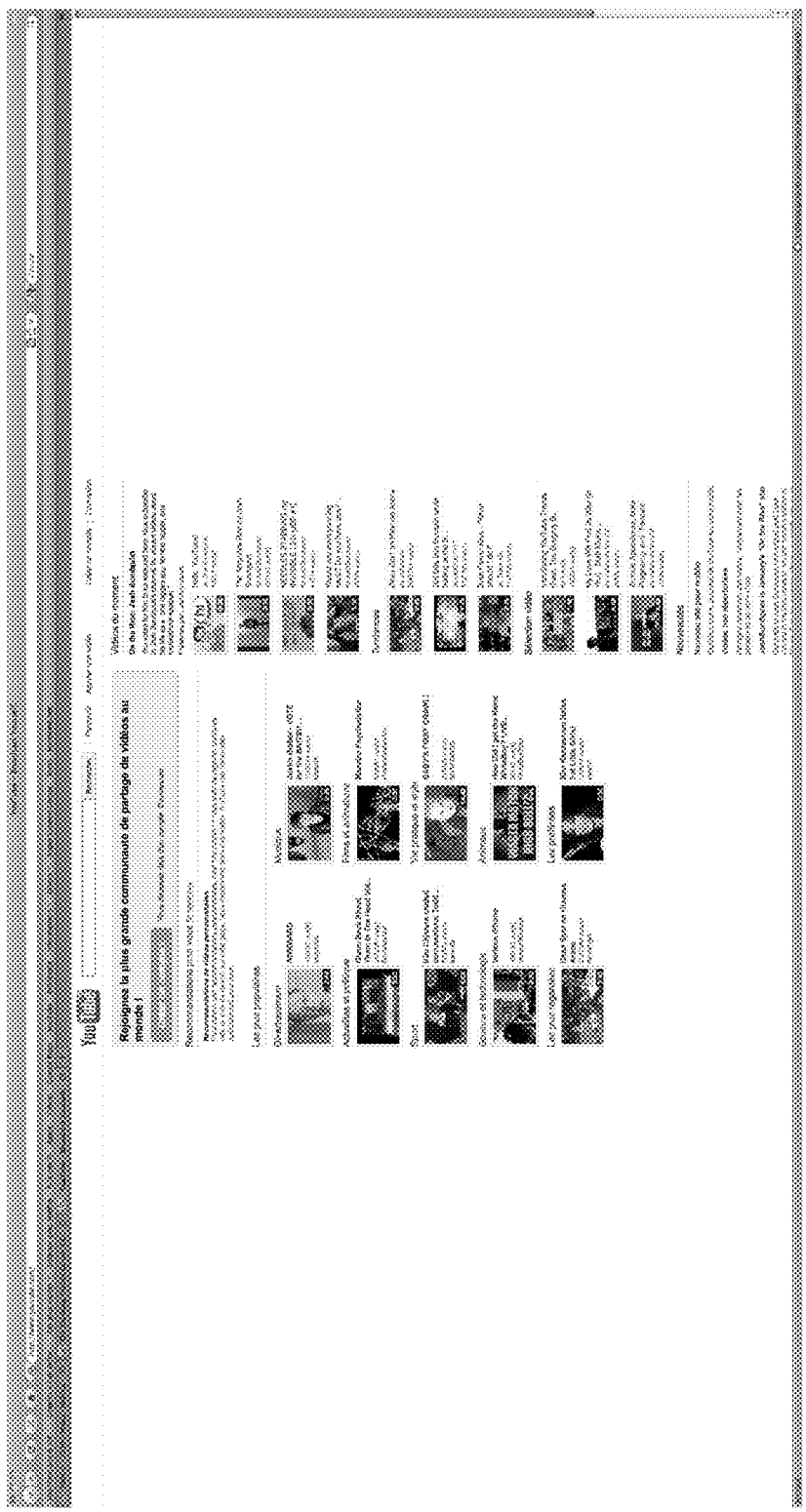
Figure 21:
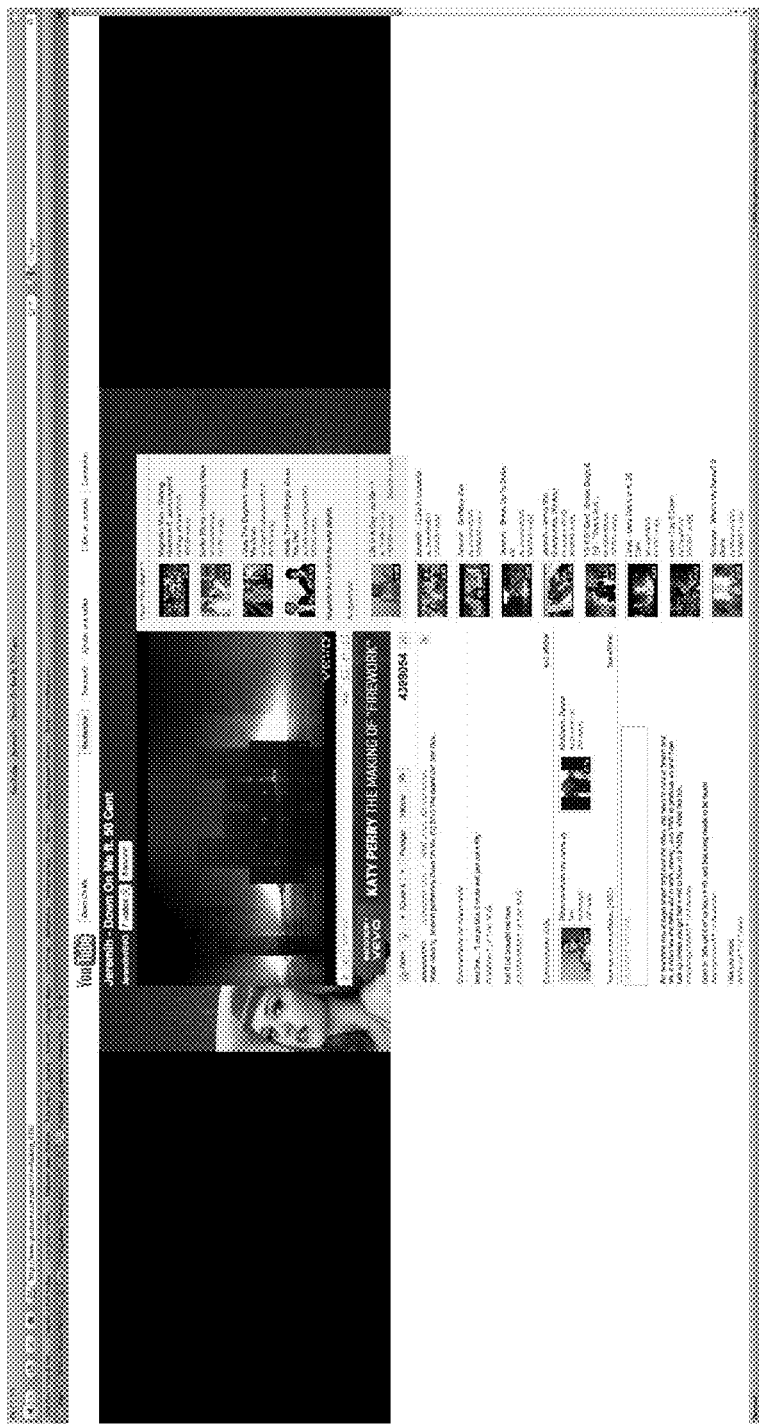
Figure 22:
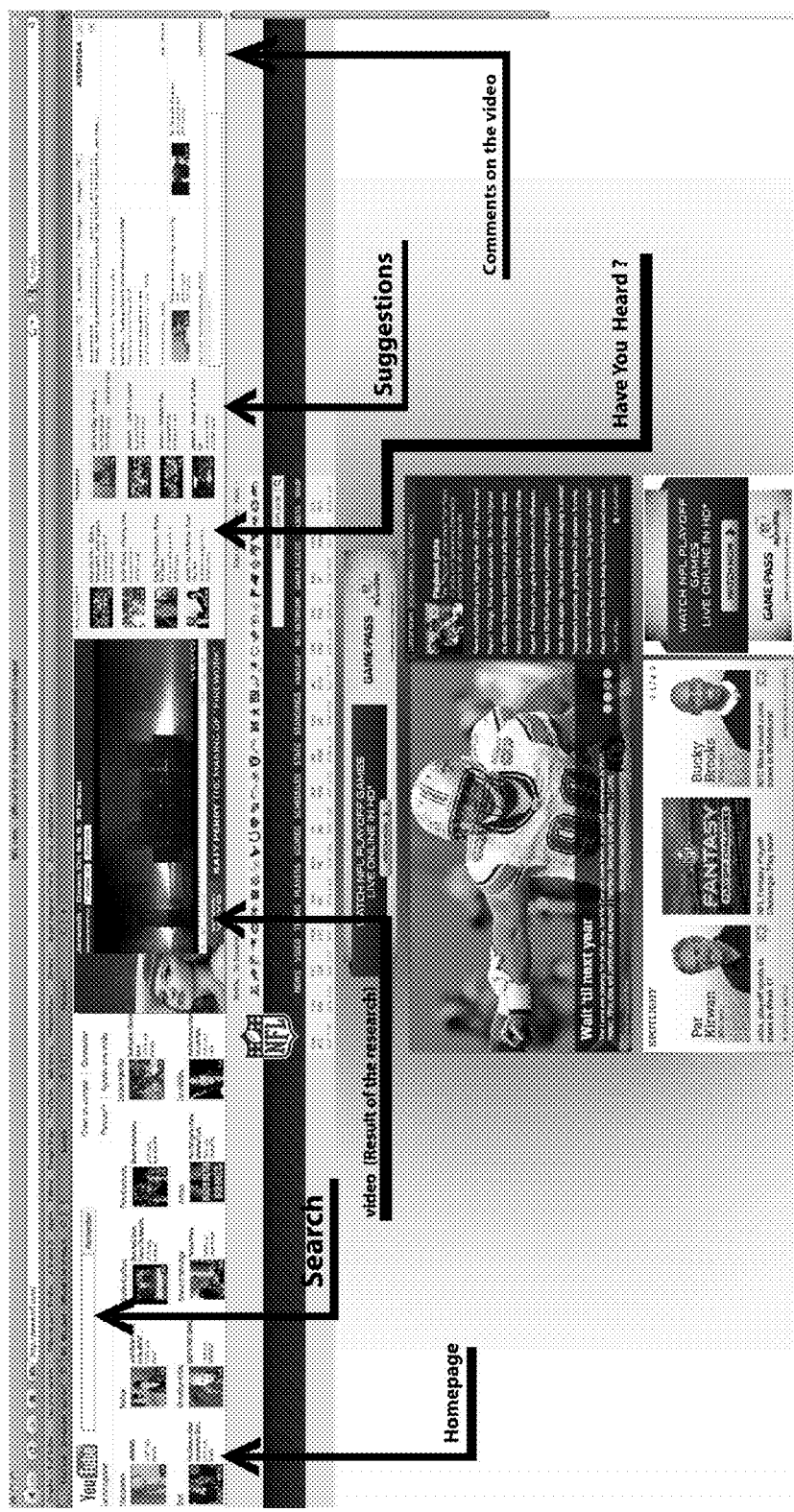

FIGS. 17-18 depict the capability of the smart browser of uploading and operating gaming applications and streaming movies at the lower alternating display window while keeping the browsing option in other websites simultaneously on the same window. A user may play the game while watching a video clip. The user may conduct a discussion with friends and correspondents while conducting a search with a search engine.

FIGS. 19-22 depict the different options for replacing items on the display window. A top permanent display area displays the important items that are instantly accessible, while the lower alternating portion displays the app store. A contact or friends list is overlaid at the right corner of the lower alternating display area. The smart browser may allow a video clip display application take over the entire display area, while minimizing all other applications and websites as tabs at an upper bar above the permanent display area. The user may carry out a search and select a particular video clip for viewing. He may then return to the display area division and use the lower alternating display area for display of other web links, websites and webpages.

Although selected embodiments of the present application have been shown and described, it is to be understood the present application is not limited to the described embodiments. Instead, it is to be appreciated that changes may be made to these embodiments without departing from the principles and spirit of the application, the scope of which is defined by the claims and the equivalents thereof.

The invention claimed is:

1. A computer device implemented browsing system comprising:
   a browser application operable on said computer device, said browser application is configured to communicate with a web server and said computer device to simultaneously retrieve, operate and display data and functional components related to a plurality of items configured to display on a single display window of said browser application over a display of said computer device;
   a processor configured to retrieve and process said data and functional components related to said plurality of items from said web server and computer device; and
   a memory configured to allocate memory space for said plurality of items,
   wherein said plurality of items are displayed, operated and made simultaneously accessible for a user on said single display window,
   wherein said browser application is configured to allocate an area for display for every item on said display window and direct all the data and functional components related to an item to said area on said display window,
   wherein said data and the functional components are simultaneously displayed on display spaces allocated for each of the plurality of items on said display window and simultaneously made operable,
   wherein the browsing system is configured to dynamically allocate and reallocate display space for data and functional components upon immediate request on said display window, and
   wherein said plurality of items are selected from software programs and applications, internet and intranet websites, web links, webpages and documents.

2. The browsing system of claim 1, wherein said browser application is configured to divide said display window into a plurality of display areas by registering coordinates defining the location and boundaries of a display area of every item on a two dimensional grid overlaid on said display window.

3. The browsing system of claim 2:
   wherein said browser application is configured to divide said display window to an area of permanent display and an area of alternating display,
   wherein said area of permanent display is located at a top portion of said display window,
   wherein said area of alternating display is located at a lower portion of said display window,
   wherein said area of permanent display is configured to accommodate display graphics, functionalities and links of items, accessible permanently, and
   wherein said area of alternating display is configured to display graphics and functional content of webpages, links, documents, functionalities and software programs selected from an item displayed on said area of permanent display.

4. The browsing system of claim 3, wherein said browser application is configured to divide said display window to an area of toggle display of permanent items and an area of alternating display, said area of toggle display of permanent items is located at a top portion of said display window, said area of alternating display is located at a lower portion of said display window, said area of toggle display of permanent items is configured to accommodate display graphics, functionalities and links of items, accessible permanently, said area of alternating display is configured to display graphics and functional content of webpages, links, documents, functionalities and software programs selected from an item displayed on said area of permanent display.

5. The browsing system of claim 3, wherein said browser application is configured to automatically replace a link, website, webpage, document or software program displayed on said area of alternating display upon electing another link, website, webpage, document or software program from said area of permanent display, wherein said browser application is configured to close or suspend the display of the previous link, website, webpage, document or software program, wherein when suspended said link, website, webpage, document or software program is miniaturized as an icon and placed on a side bar at the margins of said display window.

6. The browsing system of claim 3:
wherein said browser application is configured to accommodate a button or a link to an application store of said display window,
wherein said application store is uploaded and displayed at said area of alternating display upon pressing said button, said application store comprising a plurality of software applications operable on said browsing system, and
wherein said browser application is configured to display an application elected from said application store on said area of alternating display or part thereof or overlay said application on said area of alternating display.

7. The browsing system of claim 3:
wherein said browser application is configured to suspend the operation of said application,
wherein the display of said application is miniaturized to an icon, and
wherein said icon is automatically or manually relocated to a margin of said display window.

8. The browsing system of claim 3:
wherein said browser application is configured to enlarge a display of a link, website, webpage, document or software program on said area of alternating display over the entire area of said display window upon electing an option of maximizing said area of said alternating display, and
wherein said permanent display area is temporarily concealed behind said alternating display.

9. The browsing system of claim 3, wherein said browser application is configured to operate every item on said area of permanent display independently of all other items on said area of permanent display.

10. The browsing system of claim 8, wherein an independent operation of an item comprises page refreshing, searching, video and audio data streaming, data input, text and video messaging, correspondence, data feeding, and content uploading.

11. The browsing system of claim 1,
wherein said browser application is configured to display and operate said plurality of items at a plurality of separate areas of display on said browser application window, each of said plurality of separate areas accommodating an item of said plurality of items, and
wherein said plurality of separate areas are defined by coordinates on a grid overlaid on said browser application window.

12. The browsing system of claim 11, further comprising an application store, said browsing application is configured to display said application store in a separate display window or on a pre-selected area on said display window, said application store is displayed upon pressing a button or clicking a link on said display area, said application store comprising a plurality of applications operable on said browsing system, said applications are uploaded and displayed in a pre-selected area on said display window or overlaid on said display window upon selecting them with means selected from a cursor, a pen or a user's finger.

13. The browsing system of claim 12:
wherein said browser application is configured to close an application and return it to said application store or miniaturize said application to an icon and place said icon on a margin of said display window, and
wherein said browsing application is configured to resume the display of previous items on said display window.

14. The browsing system of claim 1, wherein said browser application is configured to enable the expansion and contraction of the dimensions of any display area of said plurality of separate display areas, said expansion and contraction being applied by a means for dragging borders or corners of said display area as defined on said grid.

15. The browsing system of claim 14, wherein said browser application is configured to display said borders or corners of said display area upon application of said means for dragging said borders or corners as defined on said grid.

16. The browsing system of claim 14, wherein said means for dragging borders or corners of said display areas are selected from a cursor located on said borders or corner, a pen or a user's finger.

17. The browsing system of claim 10:
wherein said browser application is configured to group selected display areas of said plurality of separate areas in an aggregate, said selected display areas being adjacent to each other,
wherein said browser application is configured to define a center point for said aggregate,
wherein said center point is configured to be dragged over and relocated on said grid with means for dragging selected from a cursor located on said borders or corner, a pen or a user's finger, and
wherein dragging and relocating said center point redefines the size of each area in said group of said selected display areas.

18. The browsing system of claim 10:
wherein said browser application is configured to define a center point on said grid for said display window, said center point defining the intersection of a plurality of groups of selected display areas of said plurality of separate area, each of said groups of selected display area defining an aggregate, and
wherein said browser application is configured to drag and relocate said center point on said grid, redefining the dimensions of each of said aggregates on said display window.

19. The browsing system of claim 1, wherein said browser application is configured to rearrange display components of any one of said items within an area of display allocated for any one of said items.

20. The browsing system of claim 1, wherein said browser application is configured to rearrange the display of components of a plurality of items in a single display area or in an aggregate of display areas.

21. The browsing system of claim 10, further comprising an application store,
wherein said browsing application is configured to display said application store in a separate display window or on a pre-selected area on said display window,
wherein said application store is displayed upon pressing a button or clicking a link on said display area, said application store comprising a plurality of applications operable on said browsing system, and
wherein said applications are uploaded and displayed in a pre-selected area on said display window or overlaid on it upon selecting them via a cursor, a pen or a user's finger.

22. The browsing system of claim 21:
wherein said browser application is configured to close an application and return said application to said application store or miniaturize it to an icon and place it on a margin of said display window, and wherein said browsing application is configured to resume the display of previous items on said display window.

23. The browsing system of claim 1, wherein said browsing system is configured to enable communication between items, said communication comprising data and commands importing and exporting, display of selected links, documents, video, audio and picture files, and operation of any functionality or capability associated with said data, commands, links, documents, video, audio and picture files, said browser application is configured to enable said communication among any of said items.

24. The browsing system of claim 23, wherein communication request transmitted from one item on one display area is received by a second item on a second display area, wherein said communication between said items is simultaneously displayed on said display spaces, wherein each of said display spaces contains different data and functionalities of a different item.

25. The browsing system of claim 24, wherein said first and second items are selected from short messaging services or e-mail servers.

26. The browsing system of claim 1, wherein said system is an operating system configured to be implemented in any web service provided by internet service provider, cloud-based server, website operator, intranet operator, or said browsing system is configured to be implemented on a digital processing hardware of an end-user.

27. The browsing system of claim 1, wherein said browser application is uploaded and displayed on microprocessor and screen integrated in devices, furniture and appliances selected from glass mirrors, glass windows, particularly glass windows of vehicles, private cars, trains, subway trains, particularly back seat of said private cars, trains and subway trains, and front shields of motorcycles, microwave, refrigerator and oven doors, touch clothing, tables, kitchen, room and office cabinets, doors and windows and virtual screens.

28. A non-transitory digital storage medium comprising a browsing application configured to be applied to and implemented in a browsing system as defined in claim 1.

29. The browsing system of claim 1, wherein said browsing system is configured to enable interactive communication among said items displayed on said display spaces in said display window.

30. The browsing system of claim 29, wherein first of said items is configured to receive input data in first display area allocated on said display window and transmit said input data to second of said items, said second of said items is configured to process said input data and produce and display output data on second display area allocated for said second item in said display window.

31. The browsing system of claim 30, wherein said first and second items are configured to simultaneously display said input data and output data on respective said first and second display area in said display window.

32. The browsing system of claim 30, wherein said input data is selected from correspondence between users, mathematical data, search query and general question, wherein processing comprises transmission of said correspondence, mathematical manipulation of said mathematical data and retrieving search results from databases for said search query or said general question.

33. The browsing system of claim 32, wherein said correspondence is carried out through any one of email service software, online chatting service and short messaging service (SMS).

34. The browsing system of claim 32, wherein data related to said first and second items are uploaded and retrieved in separate channels independently operated of each other.

35. The browsing system of claim 1, wherein said browser application is configured to display only most relevant or pertinent portions of any one of said items for display in a display space on said display window, wherein remaining portions are stored in cache memory until larger display space is allocated for any one of said items.

* * * * *